(«12») United States Patent
Axelsson et al.

(10) Patent No.: US 9,872,478 B2
(45) Date of Patent: Jan. 23, 2018

(54) ARRANGEMENT AND A METHOD FOR CLEANING AN END EFFECTOR OF A ROBOTIC MANIPULATION DEVICE

(71) Applicant: DELAVAL HOLDING AB, Tumba (SE)

(72) Inventors: Thomas Axelsson, Tumba (SE); Kerstin Holmstrom, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 1 day.

(21) Appl. No.: 14/901,149

(22) PCT Filed: Apr. 7, 2014

(86) PCT No.: PCT/SE2014/050430
§ 371 (c)(1),
(2) Date: Dec. 28, 2015

(87) PCT Pub. No.: WO2015/009214
PCT Pub. Date: Jan. 22, 2015

(65) Prior Publication Data
US 2016/0150755 A1 Jun. 2, 2016

(30) Foreign Application Priority Data
Jul. 16, 2013 (SE) ........................ 1350888

(51) Int. Cl.
*B08B 7/04* (2006.01)
*A01J 7/02* (2006.01)

(52) U.S. Cl.
CPC ...... *A01J 7/025* (2013.01); *A01J 7/02* (2013.01)

(58) Field of Classification Search
CPC .................................. A01J 7/025; A01J 7/02
USPC .................................................. 134/18, 137
See application file for complete search history.

(56) References Cited

U.S. PATENT DOCUMENTS

2010/0300490 A1   12/2010   Axelsson

FOREIGN PATENT DOCUMENTS

| EP | 1 913 811 A2 | 4/2008 |
|---|---|---|
| GB | 2 236 665 A | 4/1991 |
| RU | 1831273 A3 | 7/1993 |
| RU | 2 045 172 C1 | 10/1995 |
| SU | 1388114 A1 | 4/1988 |
| WO | 03/077645 A1 | 9/2003 |
| WO | 2007/040387 A1 | 4/2007 |

(Continued)

OTHER PUBLICATIONS

International-Type Search Report, dated Feb. 12, 2014, from corresponding PCT application.

(Continued)

*Primary Examiner* — Eric W Golightly
(74) *Attorney, Agent, or Firm* — Young & Thompson (57) ABSTRACT

An arrangement for cleaning an end effector (21) carried by a robotic manipulation device (9a, 9b, 9c) includes an end effector cleaning station (18) mounted within a working area of the robotic manipulation device (9a, 9b, 9c), with a spray device (26) configured to provide at least one liquid jet. A control unit (11) is, when it is time to clean the end effector (21), configured to activate the robotic manipulation device (9a, 9b, 9c) such that it moves the end effector (21) downwards from a position above the end effector cleaning station (18) to a position where it is hit by the liquid jet, wherein during this movement the end effector (21) is substantially vertical.

20 Claims, 4 Drawing Sheets

(56) References Cited

FOREIGN PATENT DOCUMENTS

| WO | 2010/115731 A1 | 10/2010 |
| WO | 2012/087233 A1 | 6/2012 |
| WO | 2013/081544 A1 | 6/2013 |

OTHER PUBLICATIONS

International Search Report, dated Jul. 24, 2014, from corresponding PCT application.
Supplementary International Search Report, dated Mar. 20, 2015, from corresponding PCT application.

ARRANGEMENT AND A METHOD FOR CLEANING AN END EFFECTOR OF A ROBOTIC MANIPULATION DEVICE

THE BACKGROUND OF THE INVENTION AND PRIOR ART

The present invention relates to an arrangement and a method for cleaning an end effector of a robotic manipulation device, wherein the end effector comprises a tool configured to perform a task in relation to a milking process of an animal in a milking stall.

In a conventional rotary parlour, the cows walk on to an annular rotating platform and enter a milking stall. The platform usually rotates with a constant speed. The milking processes of the cows are finished and the cows leave the milking stalls before they have rotated one full revolution on the platform. The continuous flow of cows gives rotary parlours a high milking capacity. In order to provide a fully automatic rotary parlour, it has been suggested to use a robotic manipulation device for preparation of teats before the milking process, a robotic manipulation device for teat cup attachment, and a robotic manipulation device for treatment of teats after the milking process.

Such robotic manipulation devices may e.g. be arranged on the outside of the rotary platform. Each robotic manipulation device comprises an end effector with at least one tool providing a task in relation to a milking process. The robotic manipulation device may move the end effector from a position outside of the platform to a position below the teats of a cow via a space between the rear legs of the cow. During this movement there is always a risk that the end effector and the tool will be contaminated by manure. Especially, a tool in the form of a nozzle for spraying aftertreatment liquid may become clogged with manure and lose its function.

SUMMARY OF THE INVENTION

The object of the present invention is to provide an arrangement and a method by which it is possible to clean an end effector of a robotic manipulation device which has been contaminated by manure in a simple and effective manner.

This object is achieved by the arrangement initially defined, which comprises a control unit configured to control the movements of the robotic manipulation device and is characterised in that it further comprises an end effector cleaning station mounted within a working area of the robotic manipulation device, comprising a spray device configured to provide at least one liquid jet, wherein the control unit is, when it is time to clean the end effector, configured to activate the robotic manipulation device such that it moves the end effector downwards from a position above the end effector cleaning station to a position where it is hit by the liquid jet, wherein during said movement the end effector is substantially vertical.

An end effector is a generally accepted term for the last link or the end of an arm of a robotic manipulation device. An end effector may consist of a gripper or a tool designed to interact with the environment. In our case, the end effector comprises a tool configured to perform a task in relation to a milking process of an animal in a milking stall. The end effector has an extension between a free end portion and an opposite end portion connected to another part of the robotic manipulation device. A robotic manipulation device is many times capable of moving an end effector to any position within its working area. Thus, it is possible to use the already existent robotic manipulation device to move the end effector downwards from a position above the end effector cleaning station to a position where it is hit by the liquid jet, wherein during said movement the end effector is substantially vertical. The free end portion forms the lowermost part of the end effector and the opposite end portion forms the uppermost part of the end effector during the cleaning process. A spray device providing a fixed liquid jet may have a very simple design. Consequently, the robotic manipulation device can move the substantially vertical end effector downwards in front of the liquid jet so that the whole end effector is cleaned. With such an orientation of the end effector during cleaning, the cleaning liquid and manure will flow downwardly along the end effector during the cleaning process and fall off at the free end portion. Thereby, the used cleaning liquid (which is usually water or water with a suitable detergent) and the removed manure will not come in contact with and contaminate other parts of the robotic manipulation device.

According to an embodiment of the invention, the end effector has a longitudinal axis which forms an angle with vertical which is smaller than 30° during the movement of the end effector in front of the liquid jet. The end effector often has an elongated shape. The longitudinal axis has an extension between the free end portion and the other end portion which is connected to another part of the robotic manipulation device. Since the end effector has a substantially vertical extension during cleaning, a relatively small space in a horizontal plane is required for moving the end effector between the different cleaning positions in relation to the liquid jet. Furthermore, it is substantially only one side of the end effector which is normally contaminated by manure—the side which is turned upwards when the end effector is in a position below a rear part of the animal in the milking stall. In view of this fact, it may be enough to move the end effector in a vertical direction in relation to the liquid jet with this side directed towards the liquid jet.

According to an embodiment of the invention, the spray device comprises at least one nozzle directing the liquid jet in a substantially horizontal direction. A nozzle with a relatively small outlet opening forms a thinner liquid jet with a higher velocity than a nozzle with a large outlet opening. The spray device may comprise at least two nozzles by which it is possible to spray liquid jets in different directions against different areas of the end effector. It is here possible to clean several areas of the end effector at the same time. The spray device may comprise at least two nozzles forming liquid jets at different height levels in the vertical direction. The spray device may comprise a vertical conduit comprising said at least two nozzles at different height levels. Such a spray device may have a very simple design. The cleaning liquid may be delivered from a cleaning liquid source to the vertical conduit from a horizontal conduit which may be arranged on a floor surface. The vertical conduit has a height defined by an upper end. The nozzles are arranged at different vertical levels on the vertical conduit. In this way it is easy to arrange the nozzles and thus the liquid jets at desired height levels and at desired distances from each other. An end effector having a substantially vertical extension during cleaning has to be moved a long distance in the vertical direction if the nozzles are arranged at the same height level. By the use of several nozzles at different levels from the ground, the vertical movement of the end effector between an upper cleaning position and a lower cleaning position may be significantly reduced.

According to an embodiment of the invention, nozzles are arranged on the vertical conduit along a length substantially corresponding to the length of the end effector. In this way, the whole end effector can be cleaned very quickly.

According to an embodiment of the invention, the end effector cleaning station comprises a stationarily mounted scraper, wherein the control unit is configured to control the robotic manipulation device such that it provides movements of the end effector in relation to the scraper such that manure is pushed off from the end effector during a cleaning process. In some cases, it may be difficult to clean the end effector in a desired manner within the time available just using liquid jets. In such a case, it is possible to provide an initial rough cleaning of the end effector by means of the scraper. The robotic manipulation device may in this case provide movements of the end effector in relation to a scraping surface of the scraper. The stationary scraper may thus have a very simple design. The scraper may be a plate-shaped element fixedly arranged in the end effector cleaning station. Preferably, at least the scraping surface of the scraper is made of a relatively soft plastic or rubber material.

According to an embodiment of the invention, the end effector cleaning station comprises a splash guard in the form of at least one wall element arranged in the vicinity of the spray device. During cleaning, there is a risk that used cleaning liquid and manure is splashed on components arranged in the vicinity of the spray device. By the use of a splash guard, it is possible to protect such components from being contaminated. A more complex splash guard may comprise wall elements having an extension around the whole spray device in a horizontal plane, an upper opening for the introduction of the end effector into an inner space formed by the splash guard, and a lower opening for removal of cleaning liquid and manure. In this case, the splash guard forms an inner space into which the end effector is inserted from above for cleaning. Such a splash guard protects surrounding components in all directions from being contaminated.

According to an embodiment of the invention, the arrangement comprises a detecting device configured to detect the presence of manure on the end effector and send this information to the control unit. The end effector may become contaminated by manure at unpredictable times. It is therefore necessary to use a detecting device which immediately detects the presence of manure on the end effector. The detecting device may be a camera mounted on the end effector. In order to perform a task in relation to a milking process it is many times necessary to detect the position of the teats of the animal in the milking stall.

In such a case, the camera used for teat detection may also be used to detect the presence of manure on the end effector. The control unit may comprise specific image analysing means for this purpose. The image analysing means are configured to detect the presence of manure on the end effector. Furthermore, the image analysing means may be able to estimate the amount of manure on the end effector and the position of the contaminated areas of the end effector. In view of this information, the control unit may determine whether the end effector needs to be cleaned. Furthermore, the cleaning process may be restricted to the contaminated areas.

According to an embodiment of the invention, the end effector carries a tool having the task to perform a treatment of the teats of the animal in the milking stall after a milking process has been finished. It has become more and more common to use robotic manipulation devices performing a treatment process of the teats of the animals after a milking process has been finished. In this case, the end effector may comprise a tool in the form of one or several nozzles from which a treatment medium is sprayed onto the teats. In case such a nozzle becomes completely covered by manure it may be clogged and lose its function.

According to an embodiment of the invention, the end effector comprises a tool having the task to attach teat cups to the animal in the milking stall. In this case, the end effector may be provided with at least one gripping member configured to fetch one or several teat cups at a time in a teat cup magazine and move them in a gripped state to a position below the teats of an animal whereupon the teat cups are attached to the teats. It is not suitable to use a gripping member covered by manure for hygienic reasons. Furthermore, a gripping member covered by a large layer of manure may lose its gripping function. Thus, it is also in this case suitable to arrange an end effector cleaning station according to the invention in the working area of the robotic manipulation device in order to make it possible to clean the end effector.

According to an embodiment of the invention, the end effector comprises a tool having the task to perform a treatment of the teats of the animal in the milking stall before a milking process is performed. Such a treatment process may be a cleaning process of the teats. In this case, the end effector may have tools in the form of nozzles spraying a cleaning liquid onto the teats, or a teat cleaning cup by which the teats are cleaned in proper order. Also in this case, a layer of manure may disturb the function of the tools. Thus, it is also in this case suitable to use an arrangement according to the invention to clean the end effector when necessary.

The invention also relates to a milking parlour comprising an annular rotary platform with a plurality of milking stalls, wherein the milking parlour comprises an arrangement according to any one of claims 1-13. It has been more and more common to use robotic manipulation devices for different tasks in relation to a milking process of animals on a rotary platform. These tasks mean that an end effector of a robotic manipulation device is moved to a position below the teats of an animal. The end effector is many times moved to this position via a path below the rear part of the animals. There is here a clear risk that the end effector and its tool will be contaminated with manure.

According to a preferred embodiment of the invention, the end effector cleaning station and the robotic manipulation device are arranged radially outside of an outer edge portion of the platform. The animals are then standing in a radial direction on the milking stall with their heads at an inner periphery of the platform. The rotary parlour is here of the parallel rotary type. In this kind of parlour, it is common to move an end effector to a position below the teats of an animal via the space between the rear legs of the animal. Alternatively, the end effector cleaning station and the robotic manipulation device may be arranged radially inside of an inner edge portion of the platform.

The object of the invention is further achieved by the method initially defined, which is characterised in that it comprises controlling the robotic manipulation device to direct the end effector in a substantially vertical direction and move it downwards to an end effector cleaning station mounted within a working area of the robotic manipulation device from a position above the end effector cleaning station to a position where the end effector is hit by at least one liquid jet from a spray device of the end effector cleaning station.

In this way, it is possible to use a spray device having a very simple design with fixed liquid jets, and let the robotic manipulation device move the substantially vertical end effector downwards in front of the liquid jet so that the whole end effector is cleaned. With such an orientation of the end effector during cleaning, the cleaning liquid and manure will flow downwardly along the end effector during the cleaning process and fall off at the free end portion. Thereby, the used cleaning liquid and the removed manure will not come in contact with and contaminate other parts of the robotic manipulation device.

According to an embodiment of the invention, the end effector is directed at an angle with vertical which is smaller than 30° during the cleaning. Since the end effector has a substantially vertical extension during cleaning, a relatively small space in a horizontal plane is required for moving the end effector between the different cleaning positions in relation to the liquid jet.

According to an embodiment of the invention, the robotic manipulation device is controlled to move the end effector to a number of cleaning positions along a predetermined path during a cleaning process. Certain areas of the end effector are more relevant to clean than others. Such an area includes the tool. It is possible to determine in advance a number of cleaning positions from which it is possible to reach the relevant areas to clean by the liquid jet. Preferably, more time is spent cleaning the most relevant areas. By the use of a predetermined path for the end effector between different cleaning positions, the end effector will always be cleaned in a desired manner. The control unit may include different kinds of programs in which the end effector is moved along different predetermined paths. In this case, it is possible to select a suitable program for different occasions.

According to an embodiment of the invention, the spray device is controlled to provide liquid jets when the end effector is in a cleaning position. The control unit may activate the spray device when it has moved the end effector to a first cleaning position and it may deactivate the spray device when the end effector has been cleaned in the last cleaning position. In this case, the liquid jet is only activated during the cleaning process. It is here possible to reduce the consumption of cleaning liquid to a minimum.

According to an embodiment of the invention, the robotic manipulation device is controlled to move the end effector in relation to a stationarily mounted scraper in end effector cleaning station in such a way that manure is pushed off from the end effector during a cleaning process. In some cases, it may be difficult to clean the end effector in a desired manner within the time available just using liquid jets. In such a case, it is possible to provide an initial rough cleaning of the end effector by means of the scraper. The robotic manipulation device may in this case move the end effector in relation to a scraping surface of the scraper.

According to an embodiment of the invention, the presence of manure on the end effector is detected and the cleaning process is activated in dependence on this detection. The end effector may become contaminated by manure at unpredictable times. It is therefore necessary to use a detecting device which immediately detects the presence of manure on the end effector and activates the cleaning if the end effector has become contaminated.

According to an embodiment of the invention, the robotic manipulation device moves the end effector to a position below the teats of an animal in the milking stall via a space between the rear legs of the animal. The shortest way for a robotic manipulation device to move an end effector to a position below the teats is many times via the space between the rear legs. During this movement, there is an increased risk that the end effector will be contaminated with manure. However, there is a risk that the end effector will be contaminated by manure at all times when it is located under a rear part of an animal. Thus, the present cleaning method can be used in all contexts where an end effector is at some point located under a rear part of an animal.

BRIEF DESCRIPTION OF THE DRAWINGS

The present invention is now to be explained more closely by means of a preferred embodiment, which is disclosed as an example, and with reference to the attached drawings.

BRIEF DESCRIPTION OF PREFERRED EMBODIMENTS OF THE INVENTION

Figure 1:
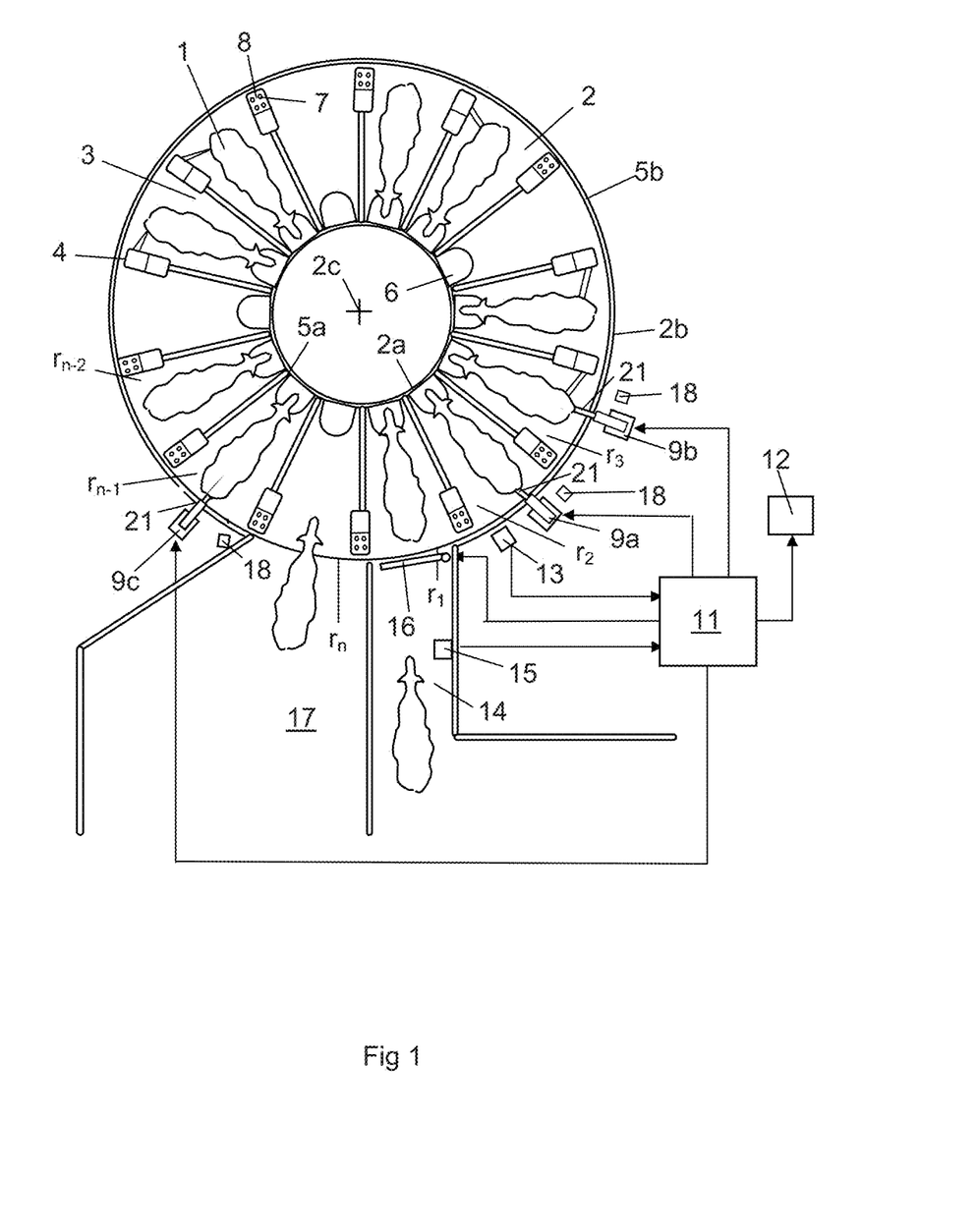
FIG. 1 shows an rotary parlour provided with an arrangement according to the invention.

FIG. 1 shows a rotary parlour for milking of cows 1. The rotary parlour comprises an annular platform 2 having an inner edge portion 2a and an outer edge portion 2b. The platform 2 rotates during operation around a vertical axis 2c. The platform 2 has an upper surface forming a floor surface for the cows 1. A plurality of fence arrangements 4 may be arranged on the platform 2. The fence arrangements 4 form milking stalls 3 for receiving individual cows 1 in predetermined milking positions. In this case, the fence arrangements 4 have an essentially straight radial extension on the platform 2 between an inner end located in the vicinity of the inner edge portion 2a of the platform and an outer end located in the vicinity of the outer edge portion 2b of the platform. The fence arrangements 4 are arranged at equal intervals around the annular platform 2. An inner fence arrangement 5a may be mounted around a main part of the inner periphery of the platform 2. An outer fence arrangement 5b may be mounted around a main part of the outer periphery of the platform 2 (normally not on the platform itself). The object of the fence arrangements 5a, 5b is to prevent the cows 1 in the milking stalls 3 from stepping out of the platform 2.

Each milking stall 3 is provided with a feeding trough 6 arranged in the vicinity of the inner periphery 2a of the platform. Each milking stall 3 is also provided with four teat cups 7 to be attached to the teats of a cow 1 standing in the milking stall 3. Each teat cup 7 is provided with a milk conduit and a pulsation conduit. Each milking stall 3 may comprise a teat cup magazine 8 adapted to hold the teat cups 7 when they are not used. A first robotic manipulation device 9a, a second robotic manipulation device 9b and a third robotic manipulation device 9c are arranged in different positions at the outer side of the platform 2.

A control unit 11 is adapted to control a schematically shown drive mechanism 12 for driving of the platform 2. The drive mechanism 12 may include a drive wheel mechanism which is arranged in contact with a circular rail on the underside of the platform 2. A position sensor 13 is adapted to sense the rotational position of the platform 2 and to send a signal to the control unit 11 about the actual position of the platform 2. The rotary parlour comprises an entrance passage 14 to the platform 2. The entrance passage 14 may be provided with a detecting sensor 15 and a movable gate 16.

An exit area 17 is arranged in connection to the platform 2. The exit area 17 is entered by the cows 1 when they leave the platform 2.

In this case, the rotary parlour is a voluntary milking system. If a cow 1 wants to be milked, she walks to the entrance passage 14 leading to the rotary platform 2. The entrance passage 14 has a width such that only one cow 1 at a time can be located in a front position of the passage 14. The detection sensor 15 detects when a cow 1 arrives to the front position of the passage 14 and sends a signal to the control unit 11 with this information. The detection sensor 15 may be an identification sensor sensing the identity of the cow 1. The gate 16 is in a closed position when the cow 1 arrives to the front position of the entrance passage 14. The control unit 11 receives substantially continuously information from the position sensor 13 about the actual rotational position of the platform 2. When a milking stall 3 arrives to a first rotational position $p_1$, just in front of the gate 16, the control unit 11 opens the gate 16 and the cow 1 enters the platform 2. The gate 16 is moved to its closed position as soon as the whole cow 1 is inside the milking stall 3. The feeding trough 6 attracts the cow 1 and facilitates the positioning of the cow 1 in the milking stall 3. The rotary parlour is of the PR (Parallel Rotary) type. The cows 1 stand here in a radial direction on the platform 2 with their heads at the inner edge portion 2a of the platform 2.

When the milking stall 3 with the cow 1 has rotated to a second rotational position $r_2$, the control unit 11 activates the first robotic manipulation device 9a. The task of the first robotic manipulation device 9a is to perform a treatment of the teats of the cow 1 before the teat cups 7 are attached. This treatment may include a cleaning process of the teats. The first robotic manipulation device 9a here comprises an end effector 21 with a tool in the form of at least one nozzle spraying a cleaning liquid on the teats. A cleaning station 18 for the end effector 21 of the first robotic manipulation device 9a is arranged at the outside of the platform 2 close to the first robotic manipulation device 9a.

When the milking stall 3 with the cow 1 has rotated to a third rotational position $r_3$, the control unit 11 activates the second robotic manipulation device 9b. The task of the second robotic manipulation device 9b is to fetch the teat cups 7 in the teat cup magazine 8 and attach them to the cow 1. The second robotic manipulation device 9b comprises an end effector 21 with a tool in the form of a gripping member which grips one or several teat cups 7 at a time and attaches them to the teats of the cow 1. A cleaning station 18 for the end effector 21 of the second robotic manipulation device 9b is arranged at the outside of the platform 2 close to the second robotic manipulation device 9b. The platform 2 is driven intermittently or with a speed such that it is no problem for the robotic manipulation devices 9a, 9b to compensate for the relative motions of the platform 2 when they perform their tasks.

The milking process of the cow 1 starts as soon as the teat cups have been attached to the teats of the cow 1. A milk meter (not shown) supervises the milk flow during the milking process. As soon as the milk flow drops below a predetermined value, a removing device (not shown) removes the teat cups 7 from the teats of the cow 1. The milking process proceeds during nearly one revolution on the platform 2. If the teat cups 7 have not been removed earlier, they are at least removed when the milking stall 3 reaches a third to last rotational position $r_{n-2}$. The control unit 11 activates the third robotic manipulation device 9c when the milking stall 3 with the cow 1 arrives to a second to last rotational position $r_{n-1}$.

The task of the third robotic manipulation device 9c is to perform an aftertreatment process of the teats of the cow 1 when the milking process has ended. The aftertreatment process may include the step of spraying a disinfecting medium on the teats of the cow 1. The third robotic manipulation device 9c comprises an end effector 21 with a tool in the form of one or several nozzles spraying a treatment medium such as a disinfection medium onto the teats. When the aftertreatment process of the teats is finished and the milking stall 3 reaches a last rotational position $r_n$, the cow 1 leaves the milking stall 3 and enters the exit area 17. A cleaning station 18 for the end effector 21 of the third robotic manipulation device 9c is arranged at the outside of the platform 2 close to the third robotic manipulation device 9c.

Figure 2:
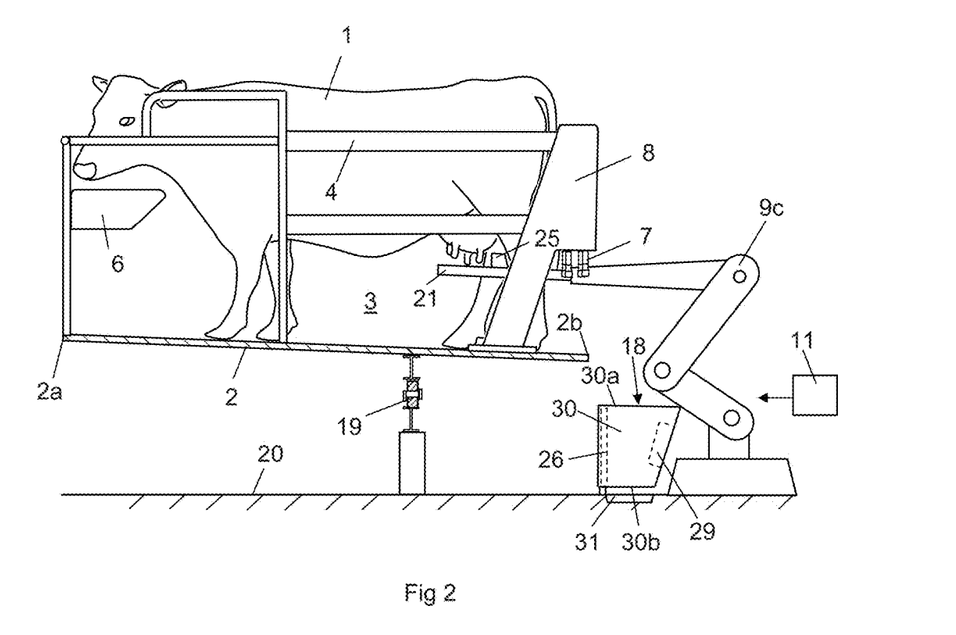
FIG. 2 shows a view from the side of one of the milking stalls on the rotary parlour.

FIG. 2 shows a side view of one of the milking stalls 3 on the rotary platform 2 during an aftertreatment process of the teats of a cow 1. The teat cup magazine 8 contains a non-shown removing device which has retracted the teat cups 7 to a parking position. The teat cup magazine 8 has a cabinet-like structure and is mounted on a floor surface of the platform 1. The teat cup magazine 8 holds the teat cups 7 in a parking position at a distance above a floor surface of the platform 2 on one side of the cow 1 in the vicinity of the outer edge portion 2b of the platform 2. The teat cups 7 hang in the parking position such that the openings of the teat cups 7 are directed downwardly. A rolling arrangement 19 allows a rotary motion of the platform 2 in relation to a floor surface 20 below the platform 2. The third robotic manipulation device 9c is mounted on the floor surface 20 at the side of the rotary platform 2. The third robotic manipulation device 9c comprises an arm mechanism in the form of a number of link elements connected to each other via joints allowing movements of the links around pivotal axes in different planes. The end effector 21 forms an outer end of the arm mechanism of the robotic manipulation device 9c.

Figure 3:
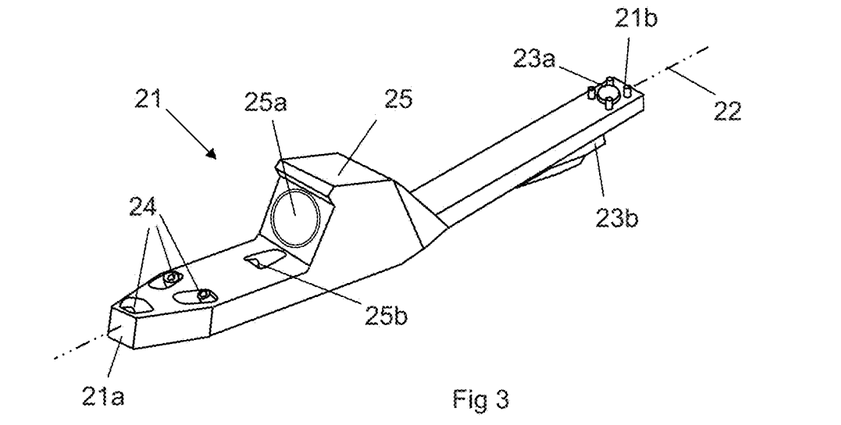
FIG. 3 shows the end effector in FIG. 2 in more detail.

FIG. 3 shows the end effector 21 in more detail. The end effector 21 has an elongated shape with a longitudinal axis 22 having an extension between a free end portion 21a and an inner end portion 21b of the end effector 21. The end effector 21 may comprise, in the vicinity of the inner end portion 21b, a connection member 23a allowing a releasable connection to an adjacent link element of the arm mechanism of the robotic manipulation device 9c. The end effector 21 may also comprise a cable connection 23b at the inner end portion 21b. The end effector 21 comprises tools in the form of a number of nozzles 24 arranged in a respective depression in an upper surface of the end effector 21 in the vicinity of the free end portion 21a. Each nozzle 24 sprays a treatment medium, which may be a disinfecting medium, onto the teats of a cow 1. The end effector comprises a camera 25 at a distance from the free end portion 21a. The camera comprises a lens 25a. A nozzle 25b is arranged in front of the lens 25a. The object of the nozzle 25b is to allow supply of a cleaning liquid to the camera lens 25a. The nozzle 25b is arranged in a depression in the upper surface of the end effector 21.

The control unit 11 controls the robotic manipulation device 9c such that it moves the end effector 21 from a resting position outside the platform 1 to a treatment position below the teats of the cow 1 via the space between the rear legs of the cow 1. The control unit 11 receives information from the camera 25 about the position of the teats of a cow 1 during this movement. When the end effector 21 has arrived to the treatment position, the control unit 11 activates a pump or opens a valve such that the treatment medium is delivered to the nozzles 24 whereupon the nozzles 24 spray the treatment medium onto the teats of the cow 1.

During the movement of the end effector 21 between the rear legs of the cow 1, there is always a risk that the end effector 21 will be contaminated by manure. If the end effector 21 receives a coating of manure on the upper side, the nozzles 23b, 24 may be clogged. Furthermore, the camera lens 25a may become coated with manure. In order to remedy this problem, the above mentioned cleaning station 18 has been arranged at the outside of the platform 2. The cleaning station 18 comprises a spray device 26 which is shown in more detail in FIG. 4. The spray device comprises a tubular conduit 26. The tubular conduit comprises a horizontal part 26a arranged on the floor surface 20 and a vertical part 26b having a vertical extension to an upper end at a suitable height level above the floor surface 20. The horizontal part 26a is connected to a non visible water source. The vertical part 26b is provided with a number of nozzles 27 at different height levels. Each nozzle 27 directs a water jet in a substantially horizontal direction. The tubular conduit 26 comprises a valve 28 by which it is possible to regulate the supply of water to the nozzles 27 in the vertical part 26b.

Figure 4:
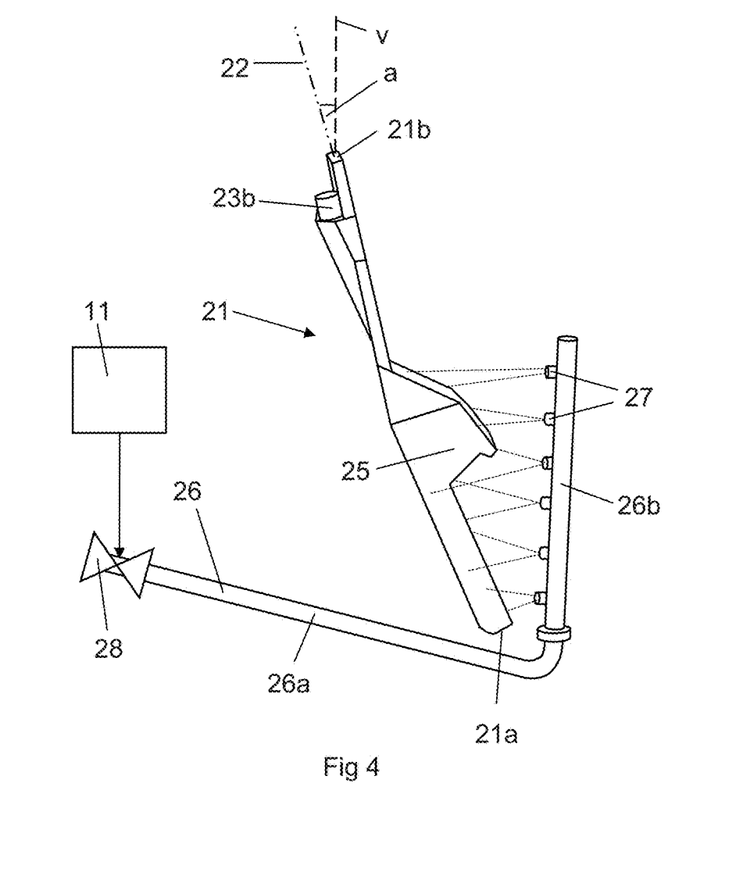
FIG. 4 shows the spray device in FIG. 2 in more detail and FIG. 5 shows a side view of a milking stall during a cleaning process of the end effector.

The cleaning station 18 also comprises a stationarily arranged scraper 29 in the vicinity of the vertical part 26b of the tubular conduit. The scraper 29 may be formed by a plate shaped element of suitable design. The scraper 29 has a scraping surface made of a flexible material such as rubber or a suitable plastic material. The cleaning station 18 comprises a splash guard 30 mounted around the vertical part 26b of the tubular conduit 26b and the scraper 29. The splash guard 30 may have a circular or rectangular shape in a horizontal plane. The splash guard 30 has an upper opening 30a allowing introduction of the end effector 21 to an inner space of the cleaning station 18. The splash guard 26 has a lower opening 30b allowing discharge of water and manure from the inner space of the cleaning station 18 to a manure channel 31 arranged in the floor surface 20. The lower opening 30b of the splash guard 30 is mounted at a small distance above the floor surface 20.

In this case, the camera 25 has the additional task of supervising the upper surface of the end effector 21 and especially the area including the nozzles 24. The control unit 11 comprises image analysing means for this purpose. The camera 25 sends images to the control unit 11 and the image analysing means is configured to detect the presence of manure 24. Furthermore, the image analysing means may also be configured to detect the presence of manure on the nozzle 25b and on the camera lens 25a.

When a milking stall 3 with a cow 1 arrives at the second to last rotational position $r_{n-1}$, the control unit 11 activates the third robotic manipulation device 9c such that it moves the end effector 21 from the resting position outside the platform 2 to a treatment position below the teats of the cow 1 via the space between the rear legs of the cow 1. The control unit 11 activates the supply of the treatment medium to the teats by means of the nozzles 24. As soon as the treatment of the teats is finished, the control unit 11 controls the robotic manipulation device such that it moves the end effector 21 back to the resting position at the outside of the platform 2 via the space between the rear legs of the cow 1. During the movement of the end effector 21 to and from the space between the rear legs of the cow 1 there is a clear risk that the end effector 21 will be contaminated by manure.

Figure 5:
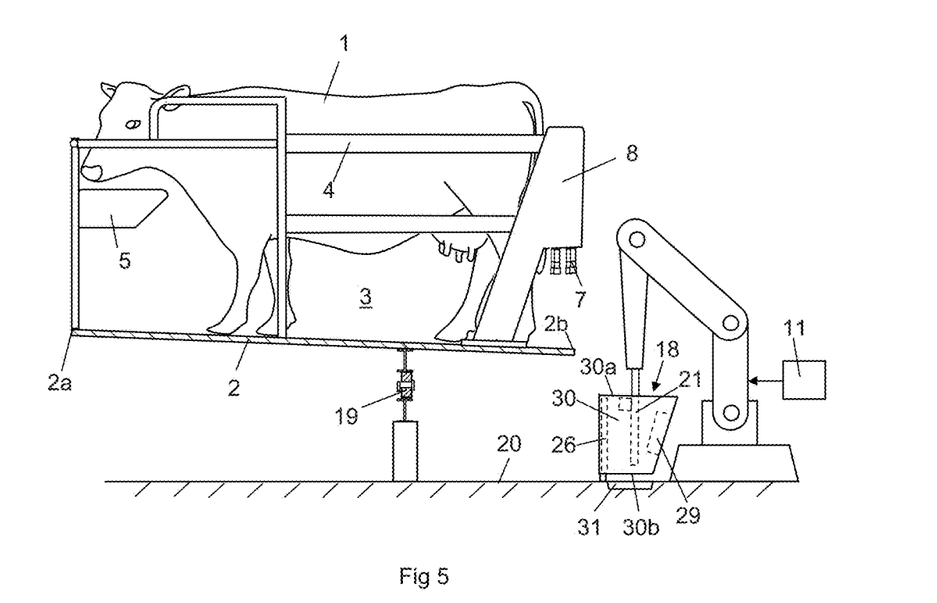

The camera 25 regularly sends images to the control unit 11. In case the images indicate the presence of manure on the end effector 21, a cleaning process of the end effector 21 is initiated. In such a case, the control unit 11 controls the third robotic manipulation device 9c so that it moves the end effector 21 downwards into the inner space of the cleaning station 18 via the upper opening 30a of the splash guard 30. The control unit 11 opens the valve 28 such that water is delivered to the vertical part 26b of the tubular conduit whereupon water jets are directed substantially horizontally towards the end effector 21 by the nozzles 27. The control unit 11 controls the movement of the robotic manipulation device 9c during the cleaning process such that the end effector 21 is moved to a number of cleaning positions in relation to the water jets. The elongated end effector 21 has a substantially vertical extension in the cleaning positions. The longitudinal axis 22 of the end effector 21 preferably forms an angle with vertical v which is smaller than 30°. The free end portion 21a is the lowest located part of the end effector 21 in all cleaning positions. The third robotic manipulation device 9c may perform vertical movements, smaller pivot movements and turning movements along its longitudinal axis 22 in relation to the liquid jets in the inner space of the cleaning station 18 during the cleaning process. The splash guard 30 prevents water and manure from splashing out on adjacent components. The used water and manure flows downwardly into the manure channel 31 below the cleaning station 18.

In case the end effector 21 has been covered by a large amount of manure, the cleaning process may also include a scraping process of the end effector 21 by means of the scraper 8. In this case, the control unit 11 controls the movements of the robotic manipulation device 9c such that it moves the end effector 21 in such a way that at least the most contaminated areas of the end effector 21 move in contact with the scraping surface of the scraper 29. In this manner, the end effector 21 receives an initial rough cleaning before it is cleaned by the water jets. Alternatively, the end effector 21 may be scraped and cleaned by the water jets at the same time. When the cleaning process of the end effector 21 is finished, the control unit 11 closes the valve 28 such that the supply of water ceases. The control unit controls the robotic manipulation device 9c such that it moves the end effector 21 from the inner space of the end effector cleaning station 18 to a predetermined resting position outside the platform 2. The end effector 21 is now ready to start an aftertreatment process of an animal in a milking stall in the second to last rotational position $r_{n-1}$.

However, the cleaning process of the end effector 21 takes some time and the platform may rotate with a relatively high speed. It is therefore possible to let one or several cows 1 move past the second to last rotational position $r_{n-1}$ without being treated when a cleaning process of the end effector 12 proceeds. Alternatively, the control unit 11 may control the drive mechanism 12 such that the platform 2 is stopped or moved with a reduced speed during a cleaning process of the end effector 21.

The first robotic manipulation 9a device comprises an end effector 21 with tools for cleaning the teats of the cows 1 before they are milked, and the second robotic manipulation device 9b comprises an end effector 21 with tools for fetching and attaching teat cups 7 to the teats of a cow 1. Also in these cases, the end effectors 21 are moved from a resting position outside the platform 2 to a position below the teats via the space between the rear legs of the cows 1. Thus, there is also in these cases a risk that the end effectors 21 will be contaminated with manure. In order to remedy this problem, cleaning stations 18 according to the above may also be arranged in positions within the working area of the robotic manipulation devices 9a, 9b.

The invention is not restricted to the described embodiment but may be varied freely within the scope of the claims. The end effector 21 is described as being substantially vertical during cleaning, and this should be understood as meaning that the end effector during cleaning is more vertical than horizontal—i.e. the angle with vertical formed by the longitudinal axis should be less than 45°. The end effector cleaning station 18 described above comprises a spray device 26, a scraper 29 and a splash guard 30. A simple end effector cleaning station 18 may be without scraper 26 and splash guard 30. Furthermore, the splash guard may have simpler design such that it prevents splashing in only one or a few directions. The end effector cleaning station is described as merely being close to the robotic manipulation device, but it may also be mounted onto the base of the robotic manipulation device.

The invention claimed is:

1. A cleaning arrangement for use with a parallel rotary parlor having a platform (2) with milking stalls for holding an animal (1) standing in a radial direction on the platform (2), the cleaning arrangement comprising:
a control unit (11);
a robotic manipulation device (9a, 9b, 9c), wherein the robotic manipulation device (9a, 9b, 9c) includes an arm mechanism comprised of connected link elements terminating with a last link element, movement of the link elements being controlled by the control unit, the robotic manipulation device (9a, 9b, 9c) being located radially outside an outer edge portion (2b) of the platform (2), the link elements being connected to each other via joints allowing movements of the link elements around pivotal axes;
an end effector (21), wherein the end effector (21) includes an inner end portion (21b) and a free end portion (21a), the inner end portion (21b) being attached to a last link element of the arm mechanism such that the end effector (21) forms an outer end of the arm mechanism, the end effector (21) having an elongated shape with a longitudinal axis (22) extending in a direction from the inner end portion (21b) to the free end portion (21a),
wherein at the free end portion (21b), the end effector (21) comprises a tool (24) that, under control of the control unit, is moveable from an initial position outside of the platform (2), via a space between the rear legs of the animal, to a position with the tool (24) being located below teats of the animal to perform a task in relation to a milking process of the animal (1) standing in the milking stall (3); and
an end effector cleaning station (18) mounted within a working area of the robotic manipulation device (9a, 9b, 9c) radially outside the outer edge portion (2b) of the platform (2),
the end effector cleaning station (18) comprising a spray device (26) that, under control of the control unit (11), provides at least one liquid jet,
wherein the control unit (11), at a time to clean the end effector (21), activates the robotic manipulation device (9a, 9b, 9c) such that the link elements and the joints of the arm mechanism move with respect to each other to pivot and move the end effector (21) downwards from a first position above the end effector cleaning station (18) to a lower, second position where the tool (24) of the end effector (21) is positioned to be hit by said liquid jet during a cleaning operation of the end effector (21), and
wherein during said movement into the second position, the longitudinal axis (22) of the end effector (21) is vertically oriented such that with the end effector in the second position, the liquid from said liquid jet that hits the end effector flows downwardly along the end effector in the direction from the inner end portion (21b) to the free end portion (21a).

2. The arrangement according to claim 1, wherein in the second position, for the cleaning operation of the end effector (21), the longitudinal axis (22) of the end effector (21) forms an angle (a) with a vertical line (v) which is smaller than 30°.

3. The arrangement according to claim 1, wherein the spray device (26) comprises at least one nozzle (27) that directs said liquid jet in a substantially horizontal direction.

4. The arrangement according to claim 3, wherein the spray device (26) comprises at least two nozzles (27) forming liquid jets at different height levels in the vertical direction.

5. The arrangement according to claim 4, wherein the spray device (26) comprises a vertical conduit (26b) comprising said at least two nozzles (27) at different height levels.

6. The arrangement according to claim 5, wherein the nozzles (27) are arranged on said vertical conduit (26b) along a length substantially corresponding to the length of the end effector.

7. The arrangement according to claim 1, wherein the end effector cleaning station (18) comprises a splash guard (30) in the form of at least one wall element arranged in the vicinity of the spray device (26).

8. The arrangement according to claim 7, wherein the end effector cleaning station (18) further comprises a stationarily mounted scraper (29), wherein the control unit (11) is configured to control the robotic manipulation device (9a, 9b, 9c) such that the robotic manipulation device (9a, 9b, 9c) provides movements of the end effector (21) in relation to the scraper (29) such that manure is pushed off from the end effector (21) during a cleaning process.

9. The arrangement according to claim 7, wherein the splash guard (30) comprises wall elements having an extension around the whole spray device (26) in a horizontal plane, an upper opening (30a) for the introduction of the end effector (21) into an inner space formed by the splash guard, and a lower opening (30b) for removal of cleaning liquid and manure.

10. The arrangement according to claim 1, wherein the arrangement further comprises a detecting device (25) configured to detect the presence of manure on the end effector (21) and send information of the detected manure to the control unit (11).

11. The arrangement according to claim 10, wherein the detecting device is a camera (25) mounted on the end effector (21).

12. The arrangement according to claim 1, wherein the tool (24) of the end effector (21) comprises an element that performs a treatment of the teats of the animal (1) in the milking stall (3) after the milking process has been finished.

13. The arrangement according to claim 1, wherein the tool (24) of the end effector (21) comprises an element that attaches teat cups (7) to the animal (1) in the milking stall (3).

14. The arrangement according to claim 1, wherein the tool (24) of the end effector (21) comprises an element that performs a treatment of the teats of the animal (1) in the milking stall (3), the end effector comprising, in a vicinity of the inner end portion (21b), a connection member (23a) that provides a releasable connection to the last link element of the arm mechanism of the robotic manipulation device, the end effector further comprising a cable connection (23b) at the inner end portion (21b), the element that performs the treatment of the teats of the animal (1) comprising at least one nozzle (24) in an upper surface of the end effector (21) in the vicinity of the free end portion (21a), the at least one nozzle (24) positioned to spray a treatment medium onto the teats of the animal.

15. The arrangement according to claim 12, wherein the tool (24) of the end effector (21) comprises at least one nozzle (24) that sprays a treatment medium onto the teats of a cow.

16. The arrangement according to claim 1, wherein the connected link elements of the arm mechanism are pivotally connected to each other to provide movement of the link elements around pivotal axes in different planes, and at the time to clean the end effector (21), the control unit (11) activates the robotic manipulation device (9a, 9b, 9c) such that the link elements pivot with respect to each other to move the end effector (21) downwards from the first position to the second position.

17. The arrangement according to claim 16, wherein the arm mechanism comprises three of said link elements pivotally connected to each other at three pivotal axis points located in three different planes.

18. A method of operating an arrangement for cleaning an end effector (21) of a robotic manipulation device (9a, 9b, 9c) of a parallel rotary parlor having a platform (2) with milking stalls for holding animals standing in a radial direction on the platform, the method comprising the steps of:
with a control unit (11), automatically controlling an arm mechanism of the robotic manipulation device located radially outside an outer edge portion (2b) of the platform (2), the arm mechanism including connected link elements terminating with a last link element, the link elements being connected to each other via joints allowing movements of the link elements around pivotal axes so that the link elements and the pivot joints of the arm mechanism move with respect to each other, movement of the link elements being controlled by the control unit;
with the control unit (11), automatically controlling the end effector (21) to move from an initial position outside of the platform (2), via a space between rear legs of an animal standing in one of the stalls, to a position with the tool (24) being located below teats of the animal to perform a task in relation to a milking process of the animal (1) in a milking stall (3), the end effector (21) including an inner end portion (21b) and a free end portion (21a), the inner end portion (21b) being attached to the last link element of the arm mechanism such that the end effector (21) forms an outer end of the arm mechanism, the end effector (21) having an elongated shape with a longitudinal axis (22) extending in a direction from the inner end portion (21b) to the free end portion (21a), wherein at the free end portion (21b), the end effector (21) comprises a tool (24) that, under the control of the control unit, performs the task in relation to the milking process of an animal (1) in a milking stall (3);
with the control unit (11), automatically controlling an end effector cleaning station (18) to provide at least one liquid jet, the end effector cleaning station (18) being mounted within a working area of the robotic manipulation device (9a, 9b, 9c) radially outside the radial edge portion (2b) of the platform, and comprising a spray device (26) that, under the control of the control unit (11), provides the at least one liquid jet; and
at a time to clean the end effector (21), having the control unit (11) activate the robotic manipulation device (9a, 9b, 9c) such that the link elements and the pivot joints of the arm mechanism move with respect to each other to pivot and move the end effector (21) downwards from a first position above the end effector cleaning station (18) to a lower, second position where the tool (24) of the end effector (21) is positioned to be hit by the liquid jet during a cleaning operation of the end effector (21), wherein during said movement into the second position, the longitudinal axis (22) of end effector (21) is vertically oriented, and with the end effector (21) in the second position controlling the end effector cleaning station (18) to provide the liquid jet directed at the tool (24) of the end effector (21) such that liquid from said liquid jet that hits the end effector flows downwardly along the end effector in the direction from the inner end portion (21b) to the free end portion (21a).

19. The method of claim 18, further comprising:
positioning the end effector cleaning station (18) radially outside the outer edge portion (2b) of the platform (2) radially between the outer edge portion (2b) of the platform (2) and the robotic manipulation device, with the spray device (26) oriented to direct the at least one liquid jet away from the outer edge portion (2b) of the platform (2) in a direction towards the robotic manipulation device, wherein,
the last link element is connected by a first of the joints to a next-to-last link element of the arm mechanism, and
the last link element and the next-to-last link element move vertically respectively in different first and second vertical planes such that when the control unit (11) activates the robotic manipulation device (9a, 9b, 9c) to move the end effector (21) downwards from the first position above the end effector cleaning station (18) to the lower, second position, the last link element and the end effector moves downward in the first vertical plane with the end effector moving into the end effector cleaning station (18) and the next-to-last link element moves in the second vertical plane.

20. The cleaning arrangement of claim 1 in combination with the platform (2), wherein,
the end effector cleaning station (18) is positioned radially outside the outer edge portion (2b) of the platform (2) radially between the outer edge portion (2b) of the platform (2) and the robotic manipulation device, with the spray device (26) oriented to direct the at least one liquid jet away from the outer edge portion (2b) of the platform (2) in a direction towards the robotic manipulation device the last link element is connected by a first of the joints to a next-to-last link element of the arm mechanism,
the last link element and the next-to-last link element move vertically respectively in different first and second vertical planes such that when the control unit (11) activates the robotic manipulation device (9a, 9b, 9c) to move the end effector (21) downwards from the first position above the end effector cleaning station (18) to the lower, second position, the last link element and the end effector moves downward in the first vertical plane with the end effector moving into the end effector cleaning station (18) and the next-to-last link element moves in the second vertical plane.

\* \* \* \* \*